Figure 1:
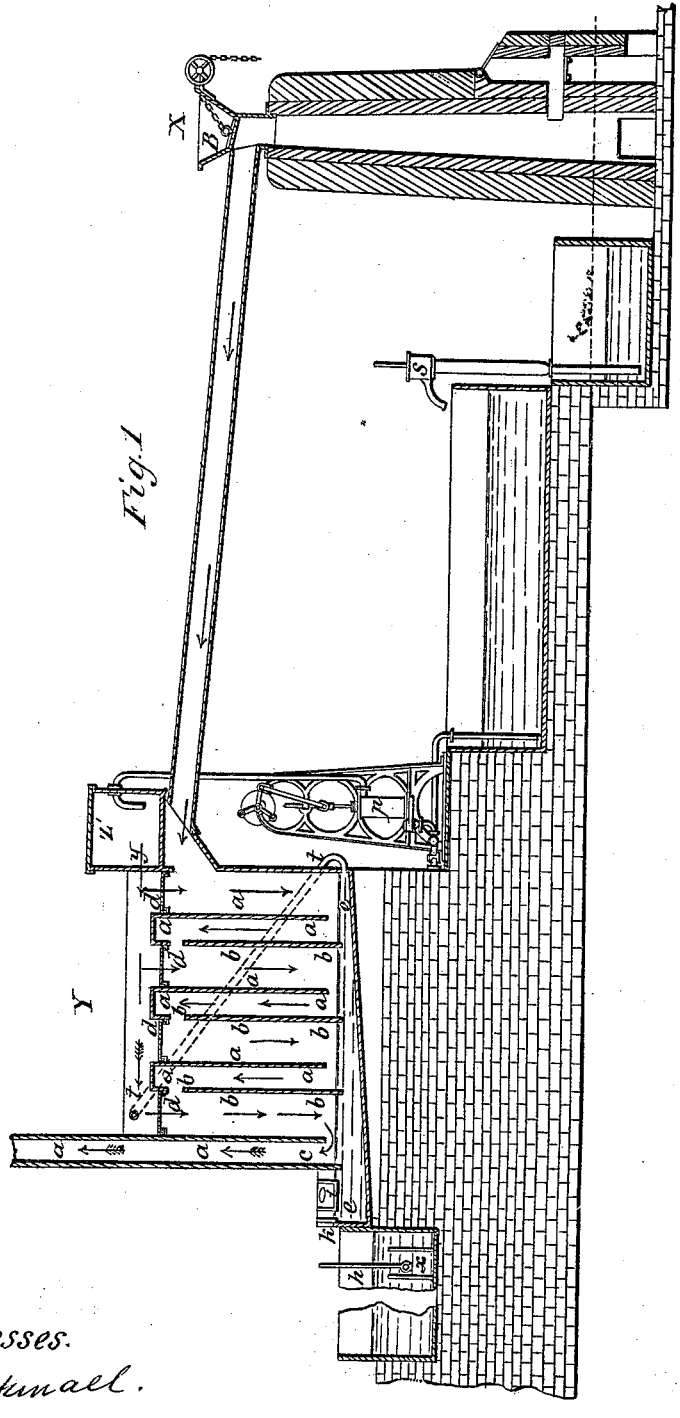

H. Cory.
Making White Lead.

№ 1,804. Patented Oct. 8, 1840.

Sheet 1,
2 Sheets

Witnesses
J. Harpinael.
W. W. Kichre.

Inventor.
Horace Cory

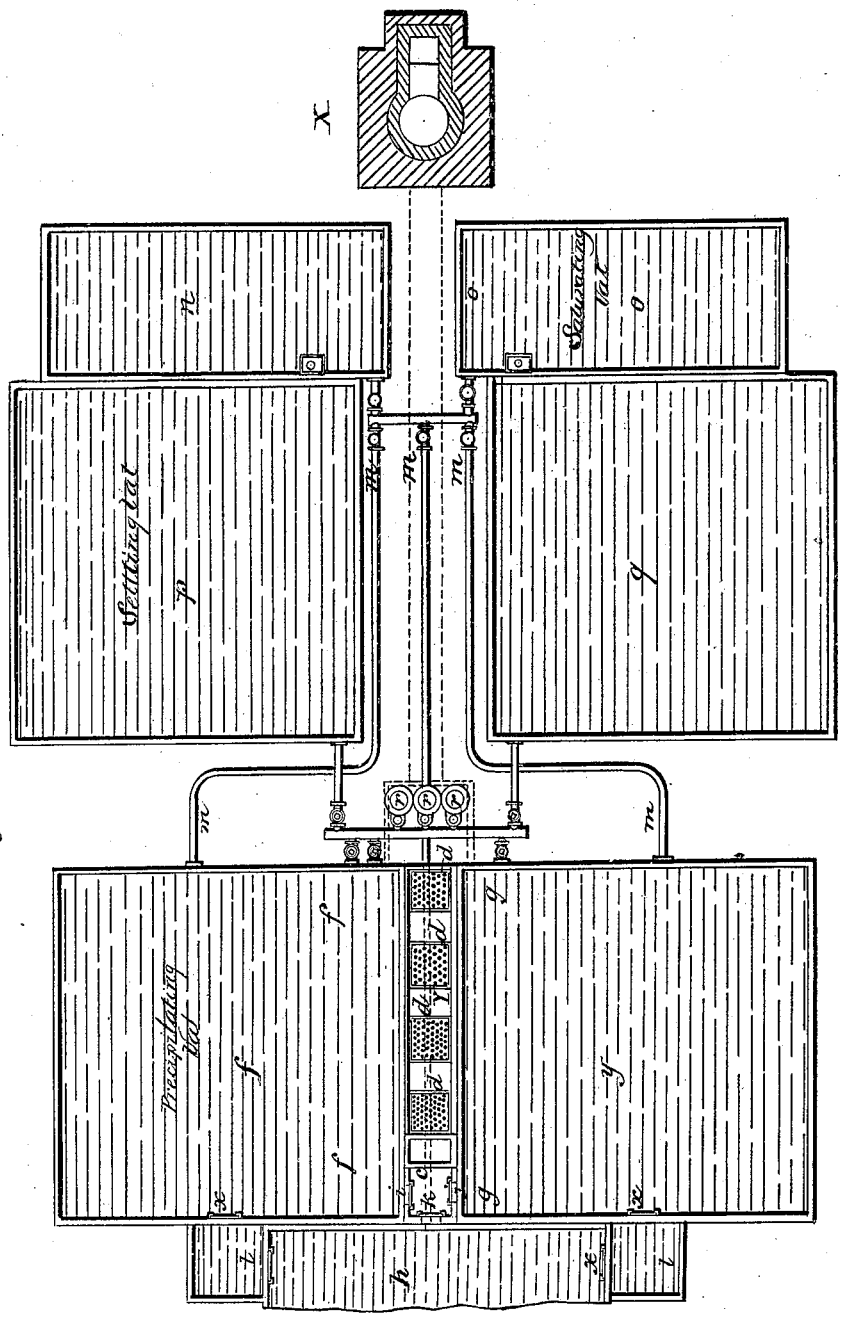

UNITED STATES PATENT OFFICE.

HORACE CORY, OF LONDON, ENGLAND.

IMPROVEMENT IN THE MANUFACTURE OF WHITE LEAD.

Specification forming part of Letters Patent No. 1,804, dated October 8, 1840.

*To all whom it may concern:*

Be it known that I, HORACE CORY, bachelor of medicine, a subject of the Queen of Great Britain, and now residing in Narrow Street, Limehouse, in the county of Middlesex, England, have invented or discovered new and useful Improvements in the Manufacture of White Lead; and I, the said HORACE CORY, do hereby declare the nature of my said invention and the manner in which the same is to be performed are fully described and ascertained in and by the following statement thereof, reference being had to the drawings hereunto annexed, and to the letters marked thereon—that is to say:

My invention relates, first, to combining the process of making white lead with the process of making lime, whereby the carbonic-acid gas evolved in the process of making lime is caused to act on suitable solutions of lead, and thus produce carbonate of lead or white lead in place of permitting such carbonic-acid gas to pass into the atmosphere.

My invention relates, secondly, to a mode of submitting suitable solutions of lead to the action of carbonic acid, and in order to give the best information in my power I will proceed to describe the drawings hereunto annexed, which represent my two improvements combined together.

In the drawings, Figure 1 represents a section of the works in elevation, and Fig. 2 shows a plan of them, some of its parts being in section.

X represents a section of a limekiln similar to one of those known as "Count Rumford's" connected with a chamber Y, into which the carbonic-acid gas from the limekiln passes by a pipe, as shown by the drawings.

Y is the chamber in which the solution of lead used in the process is submitted to the action of the carbonic-acid gas. This chamber is divided into several compartments by partitions $a$ $a$ $b$ $b$, which are so arranged as to cause the gas to make a circuitous route before it arrives at the point $c$, where there is an opening or way to the atmosphere.

$d$ $d$ are plates of copper or other suitable material perforated with small holes, such plates being turned down at their edges, in order that the edges may enter loosely into grooves or troughs, thus allowing of the plates $d$ $d$ being readily removed should any of the holes be stopped up. The lower part of the chamber is an inclined plane showing the trough $e$ $e$ and a vat $z$, by means of which a constant supply of the solution of lead is poured incessantly through the chamber. $n$ and $o$ are saturating-vats, in which the solution of lead is prepared.

$p$ and $q$ are settling-vats, into which the solution, when prepared, is raised by the pumps $s$ $s$, and in which it is left to settle till it becomes clear.

$f$, $g$, and $h$ are the precipitating-vats, in which the white lead is first deposited, and $l$ $l$ the puddling-vats, in which the white lead is prepared for drying.

$r$ $r'$ $r$ are three pumps worked by a three-throw crank, which is to be actuated by a steam-engine or other power. These pumps have a suitable arrangement of pipes and stop-cocks for communicating with the settling-vats and with the precipitating-vats, and also with the vat $z$, as is clearly shown in the drawings, and in such a manner that any of the pipes or stop-cocks may be opened to or shut off from the pumps.

The formation of the white lead is thus effected. The solution of lead, which is kept constantly supplied to the upper compartment of the chamber, falls through the perforated plates in minutely-divided showers, as shown by the blue arrows in Fig. 1, and in that state comes in contact with the carbonic-acid gas pervading that part of the chamber below the plate $d$, and the solution of lead descending through the chamber will be acted on thereby and be progressively converted into white lead, and as the gas has to take a very indirect course before it arrives at the vent $c$, as indicated by the black arrrows, It will be evident that but little will escape into the atmosphere and be lost. The solution of lead falls through the chamber into the inclined trough $e$ $e$, from whence it will flow into one or other of the precipitating-vats $f$ $g$ $h$, according as the sluice or opening $i$, $j$, or $k$ be open. In these precipitating-vats the white lead will settle down and be deposited, while the solution is raised from the vat above the perforated plates and again and again submitted to the action of the gas in the chamber till the process of conversion is completed. The precipitation of the white lead will take place in the vessels or vats *f g h*, and when the process of conversion is completed the liquor left after depositing its precipitate is run off through the pipes *m m* into the vats *n o*, to be again saturated, and the precipitaed white lead is raked into one of the puddling-vats *l l*.

Having thus described the nature of the parts and process, I will proceed to describe more in detail the materials and manner of working.

*Preparation of the gas.*—The shaft of the kiln being filled with limestone through the hopper B, and the shutter A being down and closing the gas-pipe, the fire is to be lighted, and the process of lime-making will go on, as is well understood. When the fire is well lighted, the shutter A is to be drawn up, so that the carbonic-acid gas evolved will pass through the gas-pipe into and through the compartments of the chamber Y, as indicated by the black arrows. I would here remark that although I prefer the arrangement of the limekiln shown in the drawings, I do not confine myself thereto, as the same may be varied so long as the arrangement is made suitable for conveying off the carbonic-acid gas evolved to the purpose of making white lead in place of being evolved into the atmosphere.

*Preparation of the solution.*—The solution of lead I usually employ is produced by dissolving protoxide of lead, known as "massicot" or "litharge," in acetic acid or in a solution of acetate of lead, all which is well understood; but I must remark that the following description will apply if other solvents are employed. In the saturating-vats *n o* a quantity of litharge or massicot and a solution of acetate of lead are to be mixed in order to produce a basic solution of lead, as is well understood. This solution is from time to time to be pumped into the settling-vats by the pumps *s s*, and in such manner that there shall be at all times a sufficient quantity of settled basic solution contained in one of them to be ready when required to be pumped through the chamber into any of the precipitating-vats. To work the solution in any one of the settling-vats—say *q*—the stop-cocks of the pipes must be so adjusted that on working the pumps the solution will be raised and passed into the vat Z, whence it will flow through the opening *y*, so as to keep all the perforated plates *d d* equally and uniformly covered. It thence descends through the plates into the chamber, where it will be acted on by the carbonic acid gas, and from thence flow into any one of the precipitating-vats— say *g*—through the sluice *j*, and the communication with the settling-vat *q* being then cut off and the cock to the vat *g* being opened the solution will be again and again pumped from the precipitating-vat *g* through the chamber and acted on by the gas and returned into the same vat *g*, and so on till the solution has been sufficiently acted on by the carbonic-acid gas. It is then allowed to settle its precipitate in the vat. After the white lead is precipitated the solvent is to be run off therefrom into one of the saturating-vats, (where it is again mixed with massicot or litharge,) and the precipitated white lead is to be raked or drawn into one of the puddling-vats. The white lead which is contained in the puddling-vat is to be operated on in the manner which is now practiced in puddling. When the white lead has been sufficiently freed from the solution by the operation of puddling, it may be taken out of the puddling-vats and deposited in pans, to be dried in the usual way. It will only be desirable, further, to remark that the solution in any other of the settling and precipitating vats is to be worked in the same manner. Thus it will be seen that there are always a settling-vat and precipitating-vat ready for continuing the working, while others of the precipitating-vats are allowing the solution to deposit the white lead and allowing of the white lead being raked into the puddling-vats. It will therefore be understood that the pumps *r* are continually working while the process is going on, and *t* is an overflow-pipe by which the excess of the solution pumped up will flow down into the inclined trough *e e*. I have stated the solution of lead I usually employ is produced by dissolving protoxide of lead (known as "massicot" and as "litharge") in acetic acid or in a solution of acetate of lead, all which is well understood and forms no part of my invention, similar solutions having been before prepared in the process of making white lead, and the same have been converted into white lead by means of streams of carbonic-acid gas forced through such solutions when contained in a proper vessel. This part of my invention does not therefore consist of converting solutions of lead by means of carbonic-acid gas into white lead, but only to the mode of doing so by submitting such solutions in showers or in such like minutely-divided state to the action of the gas whereby the process is more advantageously carried on, and I would have it understood that although I have mentioned acetic acid and acetate of lead as means of obtaining solutions of basic acetate of lead, yet I do not confine myself thereto, as other suitable solvents may be employed and the solutions of lead so obtained submitted to the action of carbonic-acid gas according to my invention.

Having thus described my invention, I would remark that although I have shown the two parts of it as combined in one process of making lime and of making white lead, yet it will be evident that each may be used separate from the other, but in combination with other suitable means for performing the respective processes. Thus the carbonic-acid gas of the process of lime-making may be received by proper blowing apparatus and caused to pass into suitable vessels containing suitable solutions of lead, and thereby convert the same into white lead by forcing the same through such solutions of lead and combine such process of making white lead with lead with the process of lime-making, and thus beneficially use the carbonic-acid gas evolved in the latter process. In place of receiving the carbonic-acid gas into suitable blowing apparatus, the same may be received into a gasometer similar to those used at gas-works and then used in the making of white lead; and, further, it will be evident that the second part of my invention may be used with other means of obtaining carbonic-acid gas, all that is necessary being to keep a constant supply of that gas (however produced) in the chamber or apparatus Y, (shown in the drawings,) and it will readily be understood that this apparatus may be varied so long as it possesses the capability of dividing the solution of lead into minute streams or showers, and thus extending the surface acted on by the carbonic-acid gas pervading the apparatus or chamber.

I would have it understood that what I claim as my invention is—

1. The combining of the process of making white lead with the process of making lime, whereby the carbonic-acid gas evolved in the latter process is beneficially applied in place of permitting it to pass into the atmosphere.

2. The mode of submitting suitable solutions of lead to the action of carbonic-acid gas, as above described.

In witness whereof I, the said HORACE CORY, have hereunto set my hand.

HORACE CORY.

Witnesses:
S. CARPMAEL,
W. H. RITCHIE.